United States Patent [19]

Steckler

[11] Patent Number: 5,609,193

[45] Date of Patent: Mar. 11, 1997

[54] AUTOMATED CONTAINER FOR WASTE GREASE

[75] Inventor: John F. Steckler, Houston, Tex.

[73] Assignee: Darling International Inc., Dallas, Tex.

[21] Appl. No.: 516,064

[22] Filed: Aug. 17, 1995

[51] Int. Cl.⁶ .................................................. B67D 5/02
[52] U.S. Cl. ........................ 141/231; 141/98; 141/82; 141/95; 137/341; 137/360
[58] Field of Search .................... 141/82, 95, 98, 141/231; 137/341, 360

[56] References Cited

U.S. PATENT DOCUMENTS

| | | | |
|---|---|---|---|
| 4,360,046 | 11/1982 | Streit et al. | 141/82 |
| 4,485,831 | 12/1984 | Ungerleider | 141/82 X |
| 4,646,793 | 3/1987 | Sherratt | 141/1 |
| 5,240,043 | 8/1993 | Campbell | 141/98 X |
| 5,349,994 | 9/1994 | Koeninger | 141/95 X |

*Primary Examiner*—J. Casimer Jacyna
*Attorney, Agent, or Firm*—Harold E. Meier

[57] ABSTRACT

An automated container for receiving waste grease is preferably located for convenience, safety and security reasons inside a food establishment where the waste grease is generated. The automated container comprises a tank, first and second liquid level sensors, associated liquid level indicators, a thermostat and an internal heating element. The automated container further includes an inlet and outlet line with quick connect couplings. The outlet line extends through a wall of the food establishment and terminates in a quick connect coupling located outside the food establishment.

7 Claims, 2 Drawing Sheets

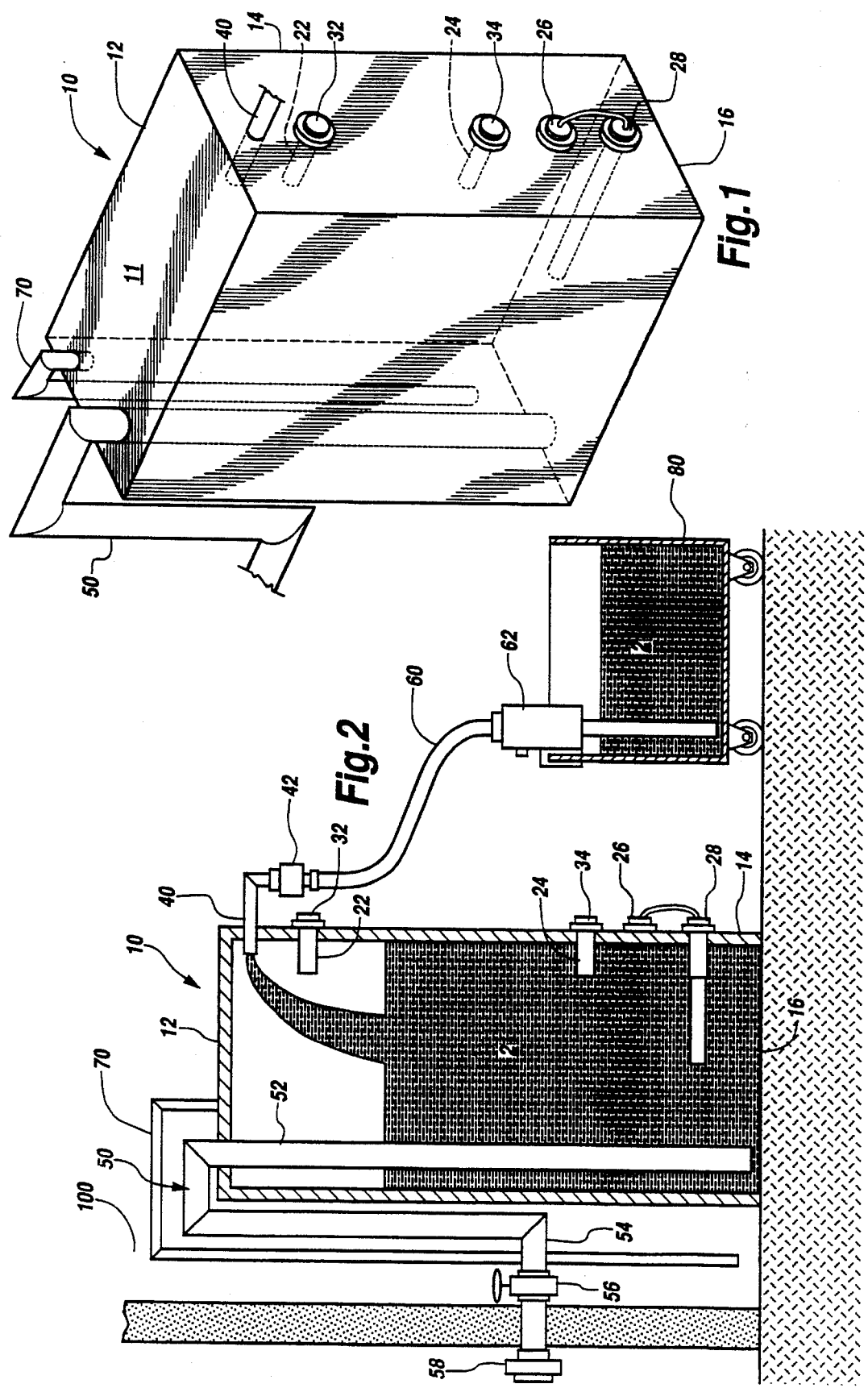

AUTOMATED CONTAINER FOR WASTE GREASE

TECHNICAL FIELD

This invention relates generally to automated containers and, in particular, to an automated container for waste grease.

BACKGROUND OF THE INVENTION

Waste grease generated by food establishments is recycled by the rendering industry. The prevailing method of collection by the renderer is via barrels and bulk containers located outside the food establishment. The waste grease is manually transported from the food establishment to the outside collection device. This has the potential of injury via hot grease burns or slippery conditions caused by spilled grease. In addition, the exterior container may allow contamination of the grease by 10 storm-water and trash as well as encouraging theft of the grease prior to receipt by the renderer. Moreover, spilled grease can be an environmental pollutant.

The present invention, a new automated container for waste grease, minimizes all of the above-described problems.

SUMMARY OF THE INVENTION

The present invention is an automated container for receiving waste grease that is preferably located for convenience, safety and security reasons inside a food establishment where the grease is generated. The automated container comprises a tank, first and second liquid level sensors, associated level indicators, a thermostat and an internal heating element. The invention includes an inlet and outlet line with quick connect couplings. The outlet line extends through a wall of the food establishment and terminates in a quick coupling located outside the food establishment.

In accordance with the present invention, waste grease is accumulated in a fryer and periodically transferred by a filter pump via the inlet line to the automated container. As the liquid rises in the automated container, liquid level indicators indicate to an observer the level of the liquid in the automated container. When the tank reaches a predetermined level, a render tank truck is connected to the outlet line and the automated container is partially or completely emptied of the grease.

BRIEF DESCRIPTION OF THE DRAWINGS

A more complete understanding of the present invention and the advantages thereof may be had by reference to the following Detailed Description when taken in conjunction with the accompanying Drawings wherein:

FIG. 1 is a perspective view illustrating the automated container for waste grease;

FIG. 2 is a cross-sectional view illustrating the automated container for waste grease.

DETAILED DESCRIPTION

Figure 3:
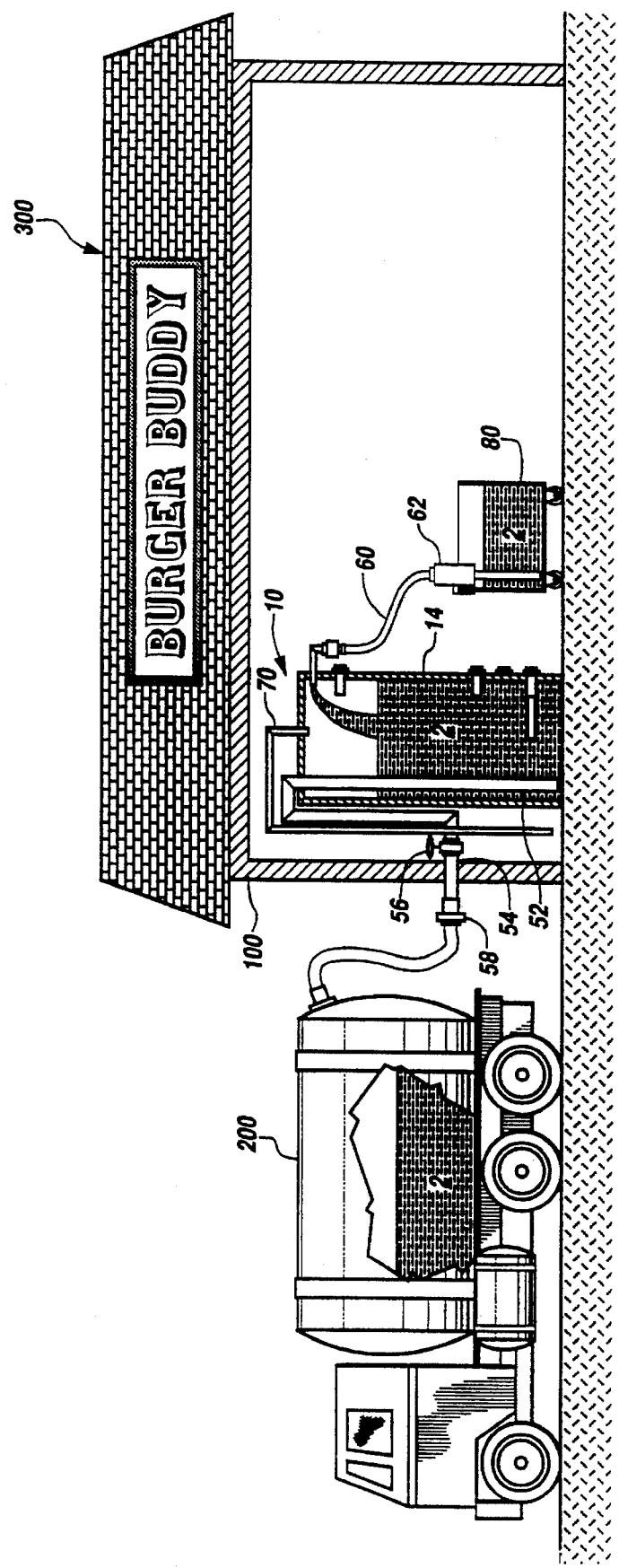
FIG. 3 is a cross-sectional view illustrating use of the automated container for waste grease.

Reference is now made to the Drawings wherein like reference characters denote like or similar parts throughout the three figures. Referring to FIG. 1, the automated container 10 for waste grease comprises a tank 11 having a top 12, a bottom 16 and either a sidewall 14 or sidewalls 14 depending on the tank cross-section. Inserted in the side wall 14 of the tank 11 is a first liquid level sensor 22 with associated external liquid level indicator 32 and a second liquid level sensor 24 with an associated liquid level indicator 34. A Madison Company model #M7700 liquid level sensor and a Telemecanique model #25307 indicator may be used. Additionally mounted to the side wall 14 is a thermostat 26 and inserted through the side wall 14 is a heating element 28. A Camco Manufacturing model #N45-028 heating element may be used. The automated container 10 further comprises an outlet line 50 and a vent line 70 that may, but is not required to, be connected to the top 12 of tank 11. A fill line 40 is illustrated as being inserted into side wall 14 of tank 11 but alternatively may be inserted into top 12.

Referring now to FIG. 2, the automatic container is preferably located for convenience, safety and security reasons inside a food establishment where waste grease 2 is generated typically, but not exclusively, in a fryer 80. Waste grease may include, but is not limited to, spent fryer grease. In the present invention, inlet line 40 further comprises a quick coupling 42 for receiving a mating coupling connected to a fill hose 60 in turn connected to the output of a filter pump 62. The outlet line 50 further comprises a portion 52 extending into the tank 11 and terminating in proximity of the bottom 16 of the tank and a portion 54 extending through a building wall 100 and terminating with a quick coupling 58 located outside the food establishment. A locking valve 56, located between tank 11 and outlet coupling 58, prevents leakage and theft of the waste grease 2. Vent line 70 extends from the top of the tank 11 for venting the tank inside the food establishment.

Turning now to FIG. 3, therein is illustrated the method of operation of automated container 1 located in a food establishment 300. Waste grease 2 is accumulated in the fryer 80. Periodically, the filter pump 62 transfers waste grease 2 to the inlet line 40 via fill hose 60 and quick coupling 42. Waste grease 2 accumulates in tank 11 by this procedure. As the level in tank 11 rises liquid level sensors 22 and 24 and liquid level indicators 32 and 34 indicate to an observer the level of the waste grease 2 in the tank 11. An audio alarm signal (not shown) may also be connected to the liquid level indicators 22 and 24 to assist in prevention of overfilling of tank 11. The thermostat 26 responds to the temperature of the waste grease 2 and via a conventional power supply connection (not shown) operates the heating element 28 to keep the temperature of the grease above a predetermined level to ensure its pumpability into a render tank truck 200. When tank 11 reaches a predetermined level the render tank truck 200 is connected to quick coupling 58 and locking valve 56 is opened, thereby allowing waste grease 2 to be pumped from the tank 11 into the render tank truck 200.

Although one embodiment of the invention has been illustrated in the accompanying Drawings and described in the foregoing Detailed Description, it will be understood that the invention is not limited to the embodiment disclosed but is capable of numerous modifications without departing from the scope of the invention as claimed.

I claim:

1. An automated container for waste grease recycling for installation within a building containing food preparation equipment comprising:

a tank having a top, bottom, at least one sidewall and a plurality of openings, said tank installed adjacent a wall and inside of a building containing food preparation equipment;

liquid level sensor means mounted to said tank, said sensor means located to respond to a high liquid level and to respond to a low liquid level;

an inlet line for transfer of waste grease to said tank, said inlet line mounted in one of the openings in said tank and connected thereto, the opening located in said tank at a level above the high liquid level;

an outlet line passing through the wall of the building and having a first end inserted in an opening in said tank and connected thereto, said outlet line terminating outside the building for connection to a tank truck, said outlet line having an inlet in said tank at a level below the low liquid level; and a vent line passing through the wall of the building and inserted in an opening in said tank and connected thereto, the opening located in said tank at a level above the opening for the inlet line; and means connected to said outlet line for controlling access to the waste grease within the tank.

2. The automated container claim 1 further including:

a thermostat mounted to a side wall of the tank; and a heating element inserted in a fifth opening in the tank, said thermostat connected to and operating said heating element.

3. The automated container of claim 1 wherein the inlet line further includes:

a quick connect coupling for connection to a line from a transportable tank holding waste grease.

4. An automated container for waste grease recycling for installation within a building containing food preparation equipment comprising:

a tank having a top, bottom, at least one sidewall and a plurality of openings, said tank installed adjacent a wall and inside of a building containing food preparation equipment;

liquid level sensor means mounted to aid tank, said sensor means located to respond to a high liquid level and to respond to a low liquid level;

an inlet line for transfer of waste grease to said tank, said inlet line having a first end inserted in an opening in said tank and connected thereto, the opening located in said tank at a level above the high liquid level, said inlet line having a second end with a quick connect coupling for connection to a line from a container for waste grease;

an outlet line passing through the wall of the building and having a first end inserted in an opening in said tank and connected thereto, said outlet line terminating outside said building in a quick connect coupling for connection to a tank truck, said outlet line having a portion within said tank and terminating in proximity to the bottom of said tank, below the low liquid level;

a vent line passing through the wall of the building and inserted in an opening in said tank and connected thereto, the opening located in said tank at a level above the opening for the inlet line;

a thermostat mounted to a side wall of the tank;

a heating element inserted in an opening in the tank, the opening located in said tank at a level below the low liquid level; and means connected to said outlet line for controlling access to the waste grease within the tank.

5. The automated container of claim 4 wherein the level sensor further includes an external level indicator.

6. The automated container of claim 4 wherein the means for controlling includes a locking valve located outside the wall of the building.

7. The automated container of claim 6 further including a plurality of liquid level sensors and external liquid level indicators inserted in openings in the tank.

* * * * *

UNITED STATES PATENT AND TRADEMARK OFFICE
CERTIFICATE OF CORRECTION

PATENT NO. : 5,609,193
DATED : March 11, 1997
INVENTOR(S) : John F. Steckler

It is certified that error appears in the above-indentified patent and that said Letters Patent is hereby corrected as shown below:

Column 1, line 19, after "by", delete "10".

Column 2, line 33, change "container 1" to --container 10--.

Column 3, line 34, change "aid" to --said--.

Signed and Sealed this

Twentieth Day of May, 1997

Attest:

BRUCE LEHMAN

Attesting Officer

Commissioner of Patents and Trademarks